Jan. 12, 1960 G. B. LONG 2,921,171
DOMESTIC APPLIANCE
Filed June 4, 1956 2 Sheets-Sheet 1

INVENTOR.
George B. Long
BY
Edwin S. Dybvig
HIS ATTORNEY

INVENTOR.
George B. Long
BY
Edwin S. Dybvig.
HIS ATTORNEY

United States Patent Office 2,921,171
Patented Jan. 12, 1960

2,921,171
DOMESTIC APPLIANCE

George B. Long, Dayton, Ohio, assignor to General Motors Corporation, Detroit, Mich., a corporation of Delaware Application June 4, 1956, Serial No. 589,183

8 Claims. (Cl. 219—10.55)

This invention relates to a domestic appliance in the form of an oven that is supplied with micro-wave energy by a micro-wave generator, and more particularly to a control device for the generator which operates to vary the power output of the generator as a function of oven timer setting.

The micro-wave oven has the great advantage of cooking food at a high rate of speed as compared with conventional ovens. Thus, foods that normally could only be cooked in an hour or fractions of an hour in a conventional oven may now be cooked in a few minutes, or, in certain cases, in a predetermined number of seconds. The normal procedure in operating a micro-wave oven has been to supply the oven from a high frequency generator that operates at substantially constant power output, and to control the cooking effect by predetermining the time interval of operation of the generator by means of a timer or the like. This constant output is usually designed to be as high as practicable to shorten cooking time as much as possible. This arrangement is well adapted for cooking foods that may be cooked in a relatively long period of time, but has certain disadvantages where the food is cooked in a relatively short period of time, for example, less than a minute. Where the food to be cooked becomes completely cooked in a short period of time, the timer setting must be extremely critical in order that the food will not be burned or undercooked. To overcome the above-mentioned difficulty, the power output of the micro-wave generator should be reduced when cooking foods that become completely cooked in short periods of time. This same food at a lower power output will take longer to cook and the timer setting need not be as critical to insure a controlled cooking effect.

It accordingly is an object of this invention to provide a micro-wave generator that is adapted to feed an oven with high frequency wave energy, with control means adapted to vary the generator power output as a function of timer setting.

It is another object to provide a micro-wave generator that feeds an oven, with control means adapted to reduce the power output of the generator when the timer is set for short periods of time.

Further objects and advantages of the present invention will be apparent from the following description, reference being had to the accompanying drawings, wherein a preferred form of the present invention is clearly shown.

Figure 1:
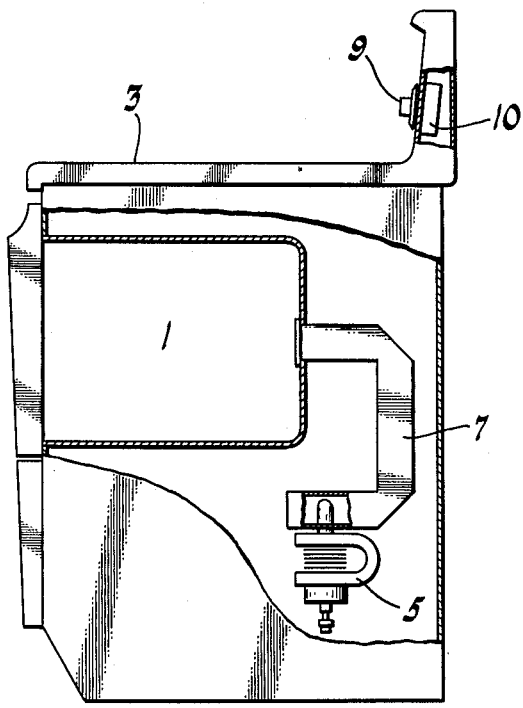
Figure 1 is a side elevation of a range having an oven that is connected with a micro-wave generator.

The oven and micro-wave generator therefor may be arranged as shown in Fig. 1. In this figure, the oven 1 is mounted in a conventional range, generally denoted by reference numeral 3. A high frequency generator 5 which in this case is a magnetron, is suitably mounted in range 3 and is connected to the oven by wave guide 7. The range is provided with a control knob 9 that is connected with a conventional timer 10, the timer controlling the operation of magnetron 5 in a manner to be more fully described hereinafter.

Figure 2:
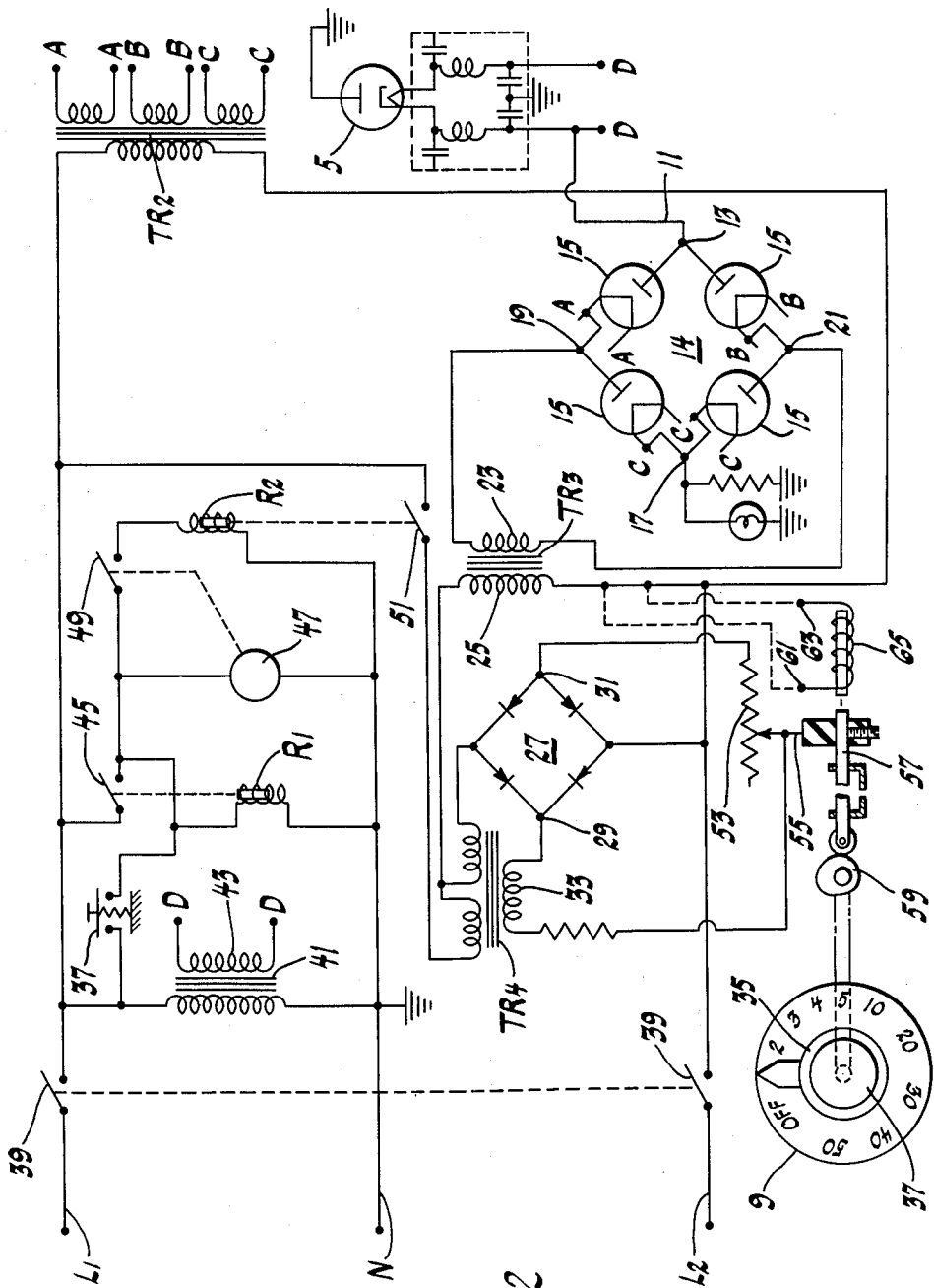
Figure 2 is a circuit diagram of a micro-wave oven generator constructed in accordance with this invention and showing the controls for the generator.

The magnetron 5 is shown schematically in Fig. 2 together with the power supply and control means for the magnetron. The magnetron 5 has its plate grounded and its cathode connected by means of a lead 11 to an output terminal 13 of a full wave bridge rectifier 14 comprised of four rectifier tubes 15. A second output terminal 17 of the bridge rectifier 14 is grounded. With this circuit arrangement, it will be apparent that the D.C. output voltage of the bridge rectifier 14 is applied across the plate and cathode of the magnetron. The input terminals 19 and 21 of the bridge rectifier are connected in series with the secondary winding 23 of transformer $TR_3$. The primary winding 25 of transformer $TR_3$ is connected in series by suitable switching means to be described hereinafter, with a 220-volt source supplied by a conventional three-wire system and is also connected in series with a saturable core reactor $TR_4$. A bridge rectifier, generally denoted by reference numeral 27 and comprising four dry rectifier elements, is connected across the 220-volt input by suitable switching means to be described hereinafter, and has its output terminals 29 and 31 connected in series with a D.C. winding 33 of the saturable core reactor. Bridge rectifier 27 and winding 33 operate to regulate the voltage applied across primary winding 25 of transformer $TR_3$. Thus, as the line voltage increases, the voltage applied across winding 33 from the bridge rectifier 27 will increase. Increase of voltage across winding 23 will vary the reactance of transformer $TR_4$ to regulate the voltage applied across primary winding 25. With this circuit arrangement the voltage across primary winding 25 will be regulated to a certain predetermined value and will not fluctuate with changes in line voltage.

The circuit just described is controlled by control knob 9 and timer 10, which includes an outer rotatable knob 35 for setting the timer and an inner depressible push-button 37. Rotation of knob 35 to the "on" position as shown in the drawing, or to any numbered timing position closes contacts 39 to connect the magnetron circuit across the 220-volt portion of the three-wire system. In this position a filament transformer 41 having an output winding 43 is connected across the 110-volt portion of the three-wire line. The output winding 43 is connected to the filament of the magnetron and thus the initial rotation of knob 35 energizes the filament of the magnetron. The equipment is now in what may be termed stand-by position as the main power supply circuits of the magnetron are not energized. The power supply for the magnetron is energized by depressing push-button 37 that closes a circuit through relay $R_1$. Energization of relay $R_1$ operates to close switch 45 that makes a holding circuit for relay $R_1$ and also connects a timer motor 47 with the 110-volt supply lines. A timer switch 49 is connected with timer motor 47 and is normally closed when knob 35 is rotated to some predetermined timing position. The timer motor operates to open switch 49 when the interval of time has elapsed for which the timer has previously been set. With the timer at some set position, a circuit is made for relay $R_2$ which operates switch 51 to connect the saturable core reactor $TR_4$, primary 25 of transformer $TR_3$, and bridge rectifier 27 with the 220-volt supply. It should be noted that closing of switch 39 also makes a circuit for the primary of filament transformer $TR_2$. It will be apparent from the above discussion that the operation of the power supply circuit of the magnetron will be accurately timed by the timing circuit. Furthermore, it is apparent that the equipment will remain in a stand-by position until the push-button 37 is depressed whereupon the power circuit is energized and the timing cycle begun.

Figure 3:
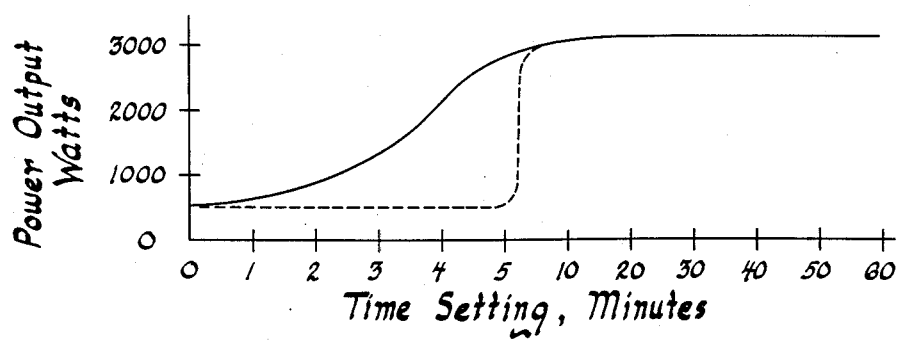
Figure 3 shows curves depicting the power output as a function of timer setting of a micro-wave generator made in accordance with this invention.

The power output of the magnetron is controlled by a variable resistor 53 that is connected in series with the D.C. winding 33 of the saturable core reactor. By changing the resistance of the variable resistor, it is possible to change the voltage being supplied across the input winding 25 of transformer TR₃ and thus control the power output of bridge rectifier 14 and magnetron 5. The movable part 55 of the variable resistor is connected to a push-rod 57. The push-rod 57 is moved axially by a cam 59 that is secured by suitable means to rotatable knob 35 for rotation therewith. Thus, as knob 35 is rotated to various timing positions, the movable part of the variable resistor is positioned to connect different resistance values in series with D.C. winding 33 of the saturable core reactor. The power output of the magnetron will thus be varied as a function of timer setting and this functional relationship is depicted in Fig. 3. Thus, for a timer setting of two minutes, the power output will be approximately 750 watts, but for a timer setting of 30 minutes, the power output will be in the neighborhood of 3,000 watts. The cam 59 may be so designed that the power output will change in a manner depicted by the dotted-line portion of the curves shown in Fig. 3. With this arrangement the power output jumps rapidly from a low value to a high value at a time setting of approximately five minutes. It will be apparent that the shape of the cam 59 and resistance characteristic of resistor 53 may be designed to give various other power output-timer setting curves and that the cam 59 might be used to actuate a switch to connect resistance into and out of a circuit with a D.C. winding 33.

The power ouput of the power supply and magnetron may also be varied by connecting a variable resistance across terminals 61 and 63 so that the variable resistor would be in series with primary winding 25 of transformer TR₃. This variable resistance would be operated in the same manner as resistance 53 and constitutes an alternate system for controlling the power output of the magnetron. The terminals 61 and 63 might also be connected with a variable inductance 65 to control the voltage supplied across primary winding 25 of transformer TR₃. The variable inductance would be actuated in response to timer setting in a similar fashion, to that described above.

While the embodiment of the invention as herein disclosed constitutes a preferred form, it is to be understood that other forms might be adopted, as may come within the scope of the claims which follow.

What is claimed is as follows:

1. In combination, a microwave generator having a variable power output and adapted to supply an oven with microwave energy, timer means associated with said generator for determining the time interval of operation of said generator, said timer means having a plurality of timing positions corresponding to different time intervals, means for presetting the power output of said generator to values between a value exceeding zero power output and a higher value, said last named means including means for varying impedance, and means connected to said timer means for controlling said presetting means.

2. In combination, a high frequency generator adapted to supply an oven with high frequency energy, means for modulating the power output of said generator over a predetermined range of values that exceed zero power output, timer means associated with said generator for predetermining the time interval of operation of said generator, selector means for presetting said timer means, and adjusting means operated by the movement of said selector means and connected with said power modulating means for determining the power output of said generator for a particular timer setting.

3. In combination, a magnetron high frequency generator adapted to supply an oven with high frequency wave energy, a power supply connected with said magnetron, timer means connected with said power supply and adapted to predetermine the time interval of operation of said power supply, impedance varying means for modulating the power output of said power supply, and means for actuating said power modulating means to change the power output of said power supply in response to a change in setting of said timer means.

4. In combination, a high frequency generator adapted to supply an oven with high frequency wave energy, timer means associated with said generator for predetermining the time interval of operation of said generator, said timer means being adapted to be set at a plurality of timing positions corresponding to different time intervals, means for modulating the power output of said generator between relatively high and low values above zero power output, and means connecting said timer means and said power modulating means, said connecting means operating said power modulating means to change the power output of said generator from said relatively low value to said relatively high value when said timer means is actuated to increase the time interval of operation of said generator.

5. In combination, an oven, a high frequency generator for supplying said oven with high frequency wave energy, power varying means for varying the power output of said high frequency generator between low and high values that exceed zero power output, timer means settable to a plurality of different timing positions for predetermining the time interval of operation of said generator, and means for setting said power varying means to said low output value in response to setting of said timer to a first timing position and for setting said power output varying means to said high output valve in response to setting of said timer to a second different timing position.

6. In combination, an oven, a high frequency generator connected with said oven for supplying high frequency wave energy thereto, power supply means for supplying power to said high frequency generator, means for varying the power output of said power supply means between values exceeding zero power output, a timer having a switch controlling said power supply means, said timer having a shiftable operator settable to a plurality of timing positions corresponding to different time intervals for maintaining said switch closed for a period of time for which said timer is set and thereafter opening said switch, and means directly operated by said shiftable operator and connected with said power output varying means for predetermining the power output of said power supply as a function of timer setting.

7. In combination, an oven, a microwave generator for supplying microwave energy to said oven, a power supply for said microwave generator including a variable impedance element in the circuit of said power supply for varying the power output of said power supply, an actuator for changing the impedance value of said variable impedance element, a timer including a switch controlling the energization of said power supply and including an operator settable to a plurality of timing positions corresponding to different time intervals, and means directly connecting said operator and said actuator for changing the power output of said power supply when said timer operator is shifted to change the setting of said timer.

8. In combination, an oven, a microwave generator for supplying microwave energy to said oven, a power supply for said microwave generator including a variable impedance element in the circuit of said power supply for varying the power output of said power supply, an actuator for changing the impedance value of said variable impedance element, a timer including an operator settable to a plurality of timing positions corresponding to different timer intervals, and means directly connecting said operator and said actuator for changing the power output of said power supply when said timer operator is shifted to change the setting of said timer.

References Cited in the file of this patent

UNITED STATES PATENTS

| | | |
|---|---|---|
| 2,400,472 | Strickland | May 14, 1946 |
| 2,595,748 | Andrews | May 6, 1952 |
| 2,632,090 | Revercomb et al. | Mar. 17, 1953 |
| 2,648,772 | Dawson et al. | Aug. 11, 1953 |
| 2,733,650 | Williams | Feb. 7, 1956 |
| 2,744,990 | Schroeder | May 8, 1956 |
| 2,839,649 | Macoicz | June 17, 1958 |